April 30, 1963    K. Q. KESSLER    3,087,294
ROTATING REEL TYPE FORAGE HARVESTER
Filed Feb. 3, 1961
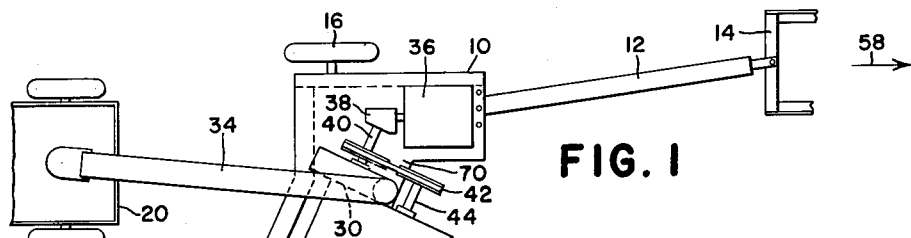
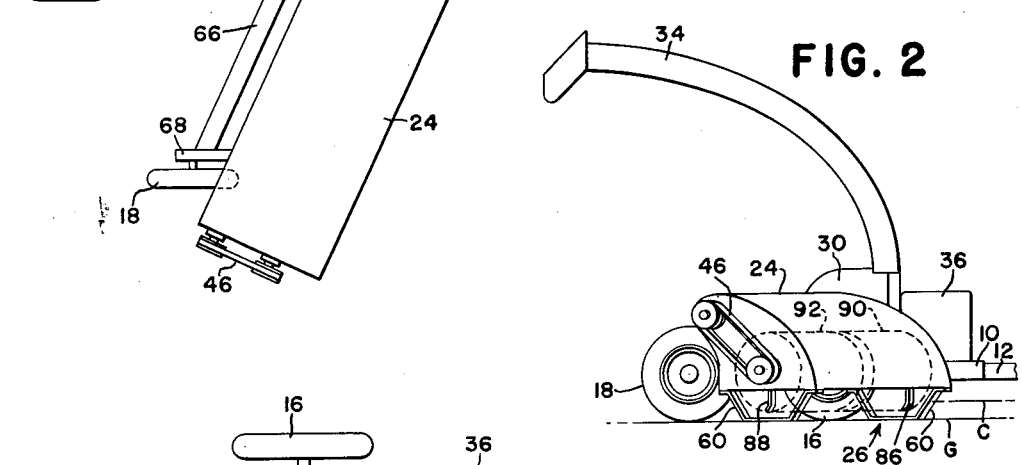
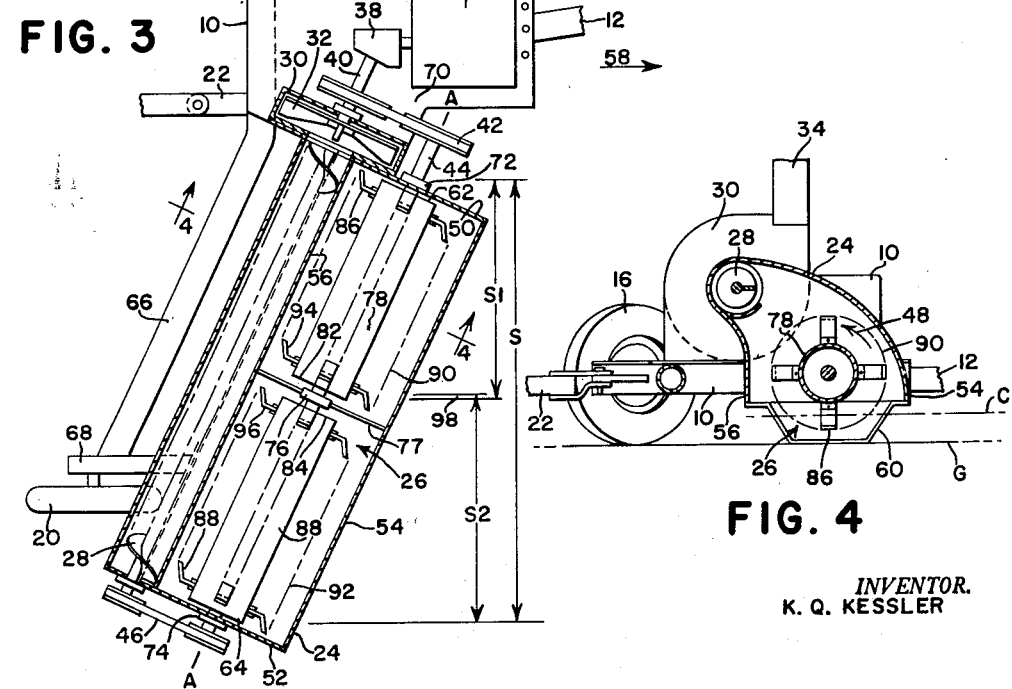
INVENTOR.
K. Q. KESSLER United States Patent Office 3,087,294
Patented Apr. 30, 1963

3,087,294
ROTATING REEL TYPE FORAGE HARVESTER
Kenneth Q. Kessler, Ottumwa, Iowa, assignor to Deere & Company, Moline, Ill., a corporation of Delaware
Filed Feb. 3, 1961, Ser. No. 86,886
6 Claims. (Cl. 56—24)

This invention relates to an agricultural machine and more particularly to a machine for handling field-borne crops.

Typical of the machine in which the present invention constitutes significant improvements is that shown in the U.S. patent to McClellan 2,871,643. That machine is depicted as a forage harvester employing a rotary crop-handling device which operates over a field to sever crops from the field and to deliver such crops to material-transfer means which in turn transfers the crops to a trailing vehicle such as a wagon or the like. As pointed out in that patent, the machine is also capable of handling crops that have already been severed from the field and that are left lying on the field and, with certain modifications, such machine can operate on crops or other material temporarily stored in piles, trenches and the like. The foregoing is mentioned by way of illustration and not limitation, since the principles of the present invention may be employed in crop-handling machines which may perform functions other than severing the crops or reducing crops that have been previously harvested and left lying in the fields.

In any event, a machine such as that referred to above is limited in operation to a swath substantially coextensive in length with the axial length of the rotary means. Of course, it is possible to increase the length of the rotary means and therefore to increase the width of the swath. This necessarily involves the use of a longer shaft which must be either of heavier design or which must include intermediate bearings in addition to the end bearings. Heavier design entails additional and undesirable cost. Intermediate bearings must necessarily intervene between the crop-handling elements and therefore untreated strips or portions of the swath would remain parallel to the line of advance. As a solution to both of these problems, the present invention provides a machine in which the rotary means is disposed diagonally to the line of advance, thereby enabling the employment of an intermediate bearing because the crop-treating elements can be provided in sets at opposite sides of such intermediate bearing and, because of the angle of the diagonally disposed axis, the sets of elements will describe coaxial cylinders whose radially innermost ends overlap in the area of crop engagement so that no untreated portion of the swath is left. The design features extreme economy and simplicity. It is a further object of the invention to provide such machine, with a diagonally arranged rotary means, with frame-sustaining ground-engaging wheels disposed relatively closely proximate to the respective ends of the rotary means whereby to secure desirable gaging action. It is a further object of the invention to employ the principles of the invention in a machine of the type forming the subject of the above-noted patent, utilizing in conjunction with the rotary means an overlying structure in the form of a hood or its equivalent and to mount the intermediate bearing on means connected between fore and aft portions of the hood.

The foregoing and other important and desirable features inherent and encompassed by the invention will become apparent as a preferred embodiment thereof is disclosed in detail in the ensuing description and accompanying sheet of drawings, the figures of which are described below.

FIG. 1 is a plan view of a typical machine embodying the present invention, illustrating in conjunction therewith the rear portion of a representative draft vehicle and the forward portion of a typical trailing vehicle.

FIG. 2 is a side elevational view of the machine shown in FIG. 1, the portions of the draft and trailing vehicle being omitted.

FIG. 3 is an enlarged view, partly in section, showing the interior structure and illustrating particularly the arrangement of the rotary means.

FIG. 4 is a section substantially on the line 4—4 of FIG. 3.

In its basic aspects, the machine illustrated here by way of example is similar to that in the above-noted McClellan patent, at least to the extent that it has a mobile frame 10 including a draft tongue 12 by means of which it may be towed by a tractor or similar draft vehicle (not shown), the drawbar of which is shown at 14. The frame 10 is rendered mobile for advance over a field by first and second or left and right hand wheels 16 and 18, respectively, and a trailing vehicle, such as a wagon 20, may be drawn by the machine via a trailer hitch shown at 22 in FIGS. 3 and 4.

The frame includes a housing or hood structure 24 which overlies rotary means 26 and a conveyor in the form of an auger 28 which delivers to a blower housing 30 in which a rotary blower 32 operates to deliver crops to the trailing wagon 20 via a discharge spout 34. The machine may be powered in any suitable fashion, as from a separate power source carried thereby, such as an internal combustion engine shown at 36. This engine may deliver to a gear box 38 which drives a shaft 40 coaxially connected to the blower 32. The shaft may be belted at 42 to an input shaft 44 coaxially connected to the rotary means 26. The other end of the rotary means may be belted at 46 to the outer or input end of the auger 28. The nature of the drive is such that the rotary means 26 rotates about its axis A—A in the direction of the arrow 48 (FIG. 4). This direction of rotation is counterclockwise and that is also the direction of rotation of the auger 28 and blower 32.

The significant distinction of the presently disclosed machine over that forming the subject matter of the McClellan patent, previously referred to, is that in the present case the elongated rotary means 26 has its length disposed diagonally to the line of advance, with its axis of rotation A—A horizontal, parallel to the length of the rotary means and spaced above the ground so that crop-treating elements, to be described below, engage crops borne by the field. As a typical example, whether the crops are standing in the field or lying on stubble as a result of a previous cutting operation, or otherwise, the crops will be at a relatively substantial depth, the tops of which will lie, say, at a level represented by the line C, which is spaced above the ground as shown at G. Because of rotation of the rotary means 26 in the direction of the arrow 48, as described above, the crops will be picked up from the ground and will be thrown by the rotary means upwardly and along the contour of the hood to the auger 28 which will in turn convey these crops to the blower 32 for ultimate handling as already covered. The crops are confined to travel in this manner by the shape of the hood or housing means 24, which in this particular case is generally in the form of an inverted U closed at its opposite ends as at 50 and 52 and having front and rear elongated portions 54 and 56, respectively, parallel to the axis A—A. The axis of the auger 28 is also parallel to the axis A—A and the auger and blower 32 are in this instance coaxial or substantially so; although, these details are relatively unimportant so far as concerns the present invention. The rearward inclination of the axis A—A (bearing in mind that the machine travels forwardly as represented by the arrow 58 in FIGS. 1 and 3) is in the order of 10 to 30 degrees, with the preferred angle being approximately 15 degrees to a line at right angles to the line of advance.

The housing 24, having the first and second side walls or ends 50 and 52 encloses the rotary means 26 from above, leaving a little less than a semi-circular portion of the rotary means exposed at the bottom of the housing (FIG. 4), and the under portion of the housing may be provided at opposite ends with runners or guards 60, which serve not only as dividers during operation but also as supports for the machine when it is disconnected from its draft source.

The rotary means, thus partially enclosed, has first and second opposite ends 62 and 64, the former being to the left and the latter to the right, these expressions being used with reference to the position of an observer standing behind the machine and facing forwardly. Because of the rearward inclination of the axis A—A, the end 62 leads or is in advance of the end 64. The entire housing structure of course partakes of this diagonal disposition and the wheels 16 and 18 are accordingly offset fore and aft as well as being transversely spaced apart, the wheel 16 lying relatively close to the end 62 of the rotary means and the wheel 20 lying relatively close to the right-hand end 64 of the rotary means, as well as being disposed laterally inwardly or to the left and also rearwardly of the rotary means in this area. This location of the wheels provides desirable gaging action for the rotary means during operation. The frame includes a diagonal extension 66 which adequately mounts the wheel 20 and which further includes a forwardly extending arm 68 for supporting the right-hand end of the housing 24. The inner end of the housing 24 may be appropriately supported on a proximate portion of the frame 10 that carries the engine 36, a representative supporting part being designated in the area of the numeral 70, which part also supports the blower housing 30.

In an exemplary construction, the rotary means may comprise the shaft 44, which may be elongated so as to extend from end to end of the housing 24 and also outwardly to the left for the driving belt connection 42. The shaft will be supported by first and second bearings 72 and 74 coaxially carried respectively by the housing end walls 50 and 52. In addition, an intermediate portion of the rotary means as represented by the shaft 44 will be carried by a third or intermediate bearing 76. In this case, a fore and aft brace 77 extends between the front and rear portions 54 and 56 of the housing 24, being rigidly secured thereto to provide adequate support for the central or third bearing 76. The support member 77 will of course be perpendicular to the axis A—A.

That portion of the shaft between the first and third bearings 72 and 76 carries, in this particular case, a concentric tube 78, rigidly secured to that shaft portion, and a similar tube 80 is carried by that portion of the shaft 44 between the second and third bearings 74 and 76. Each of the tubes 78 and 80 is of sufficient length to extend between the central bearing and its respective end bearing, the tube 78 having an inner end 82 closely proximate to the left-hand side of the bearing 76 and the tube 80 having an inner end 84 closely proximate to the right-hand side of the bearings 76. The rotary means includes peripherally disposed crop-engaging elements, here represented as first and second sets or groups of elements 86 and 88. The elements in each set may be of the type disclosed in the above identified McClellan patent, being in the form of radial arms pivotally mounted in any suitable manner on the associated tube and projecting uniformly radially outwardly so that during operation the set of elements 86 will describe a cylinder 90 and the set of elements 88 will describe a coaxial similar cylinder 92. These cylinders are of such diameter (FIG. 4) as to intersect the crop line C; that is to say, the elements as they rotate in the direction of the arrow 48 will pass downwardly into, then forwardly through and then upwardly out of the crops. In this case, the axis A—A of the rotary means is above the level of the crops but it will be clear that the crops could be taller or "deeper" so that the level would more closely approach the axis A—A or even be above this axis, since these machines are operated at times in fields of standing corn and similar relatively tall crops. Hence, the present disclosure is by way of illustration only.

The width of a swath that will be cut by the rotary means 26 is of course less than the axial length of the diagonally disposed rotary means, but this width may be made substantially greater than that available by machines currently known. In the present case, a typical swath width is shown by the dimension S in FIG. 3, being measured between the point of intersection of the outermost of the elements in the rotary means with the crop level C. Hence, the dimension S represents the basic swath width, which is here accomplished by the provision of the two sets of elements 86 and 88 in the rotary means 26, because, even though the inner ends 82 and 84 of the tubes 78 and 80 are spaced apart axially, the diagonal disposition of the rotary means enables the innermost elements of the sets, as at 94 and 96, to describe circular paths radial to the axis A—A and which transversely overlap in a central area of the swath so as to engage the crops entirely across the entire swath, each set of elements cutting or engaging the crop respectively in partial swaths as represented by the dimensions $S^1$ and $S^2$. A representative overlap is illustrated at 98. Hence, the rotary means as described enables the employment of the central or intermediate bearing 76 without leaving any uncut or unengaged portion of the swath. This materially simplifies and reduces the cost of the construction and at the same time adds the necessary strength to accommodate the increased length of the rotary means. It is preferred that the bearing 76 be centrally located between the end bearings 72 and 74 as a matter of design economy and operational balance.

Features of the invention other than those categorically enumerated will readily occur to those versed in the art, as will many modifications and alterations in the preferred embodiment illustrated and described, all of which may be achieved without departure from the spirit and scope of the invention.

What is claimed is:

1. A crop-chopping machine of the class described, comprising: a mobile frame adapted to advance over a field having crops borne by the field in such manner that the tops of the crops are spaced above the ground level; elongated rotary chopping means having first and second outer ends and disposed with its length generally horizontal and diagonal to the line of advance and having a single continuous axis of rotation generally parallel to its length and spaced above the ground to span a crop swath of predetermined width measured at right angles to the line of advance of the machine; means journalling the rotary means on the frame on said axis, including first and second coaxial bearings fixedly mounted on the frame respectively closely adjacent to said first and second ends and a third bearing on said axis and fixedly mounted on the frame and supporting the rotary means at a portion thereof intermediate said ends; peripherally arranged chopping elements carried by and for rotation with said rotary means and including a first set of elements between the first and third bearings and a second set of elements between the second and third bearings, said sets standing out radially from said axis when rotating and describing first and second coaxial cylinders on said axis of such diameters that said elements pass through and chop the crops above ground level, said sets respectively including inner elements closely spaced apart respectively at axially opposite sides of said third bearing to travel respectively in circular paths defining the inner ends of said cylinders and transversely overlapping in the area of said swath in which said inner elements chop the crops so that both sets of elements combined chop the crops entirely across said swath.

2. The invention defined in claim 1, in which: said frame includes hood means overlying the rotary means and extending from end to end thereof and having front and rear portions respectively ahead of and behind the third bearing and radially clear of said elements; and said supporting means includes a support member normal to said axis and extending between and connected to said front and rear portions in radial register with and connected to said third bearing.

3. The invention defined in claim 1, including: a first ground-engaging wheel sustaining the frame and located relatively closely adjacent to and rearwardly of the first end of the rotary means; and a second ground-engaging wheel sustaining the frame and located relatively closely adjacent to the second end of said rotary means.

4. The invention defined in claim 3, in which: both wheels are rearwardly of their respective ends of said rotary means.

5. The invention defined in claim 1, in which: the first end of the rotary means is in advance of said second end; and said frame includes first and second transversely spaced apart and fore-and-aft offset ground-engaging wheels respectively proximate to said ends.

6. The invention defined in claim 5, in which: the second wheel is closely rearwardly of and transversely inwardly of said second end.

References Cited in the file of this patent

UNITED STATES PATENTS

| | | |
|---|---|---|
| 1,656,517 | Goulet | Jan. 17, 1928 |
| 2,162,506 | Jones et al. | June 13, 1939 |
| 2,465,405 | Strawn | Mar. 29, 1949 |
| 2,633,687 | Bannister | Apr. 7, 1953 |
| 2,667,022 | Richey | Jan. 26, 1954 |
| 2,835,094 | Black | May 20, 1958 |
| 2,871,643 | McClellan | Feb. 3, 1959 |